United States Patent [19]

Ferrentino

[11] 4,332,510

[45] Jun. 1, 1982

[54] METHOD AND APPARATUS FOR RECOVERING A LENGTH OF AN ELONGATED BODY, SUBMERGED IN WATER

[75] Inventor: Antonio Ferrentino, Monza, Italy

[73] Assignee: Industrie Pirelli Societa per Azioni, Milan, Italy

[21] Appl. No.: 136,323

[22] Filed: Apr. 1, 1980

[30] Foreign Application Priority Data

Apr. 5, 1979 [IT] Italy ............................... 21604 A/79

[51] Int. Cl.³ .............................................. F16L 1/04
[52] U.S. Cl. ................................. 405/171; 294/66 R; 405/173
[58] Field of Search ............... 405/158, 173, 185, 171, 405/168-170; 294/66 R, 66 A; 114/50-54

[56] References Cited

U.S. PATENT DOCUMENTS

| | | | |
|---|---|---|---|
| 3,367,299 | 2/1968 | Sayre | 114/51 |
| 3,777,499 | 12/1973 | Matthews | 405/173 |
| 3,835,656 | 9/1974 | McDermott | 405/170 |
| 3,897,099 | 7/1975 | Scodino et al. | 294/66 R |
| 4,051,687 | 10/1977 | Ells | 405/171 X |

FOREIGN PATENT DOCUMENTS 538561 8/1941 United Kingdom .
947289 1/1964 United Kingdom .

Primary Examiner—Ernest R. Purser
Attorney, Agent, or Firm—Brooks, Haidt, Haffner & Delahunty

[57] ABSTRACT

Method and apparatus for recovering a length of an electric cable from great depths of water in which a first device with a buoyancy tank and cable gripping jaws is lowered into the water and guided into position over the cable by an operator controlled submarine having manipulating arms. The tank is then released from the remaining equipment and rises to the water surface letting out a rope secured at its lower end to the remaining equipment. The operator then operates the jaws into gripping engagement with the cable. Thereafter, the rope is secured to a tensioning line on a surface ship, and a second device is lowered by the ship along the rope so as to settle in the remaining equipment, the latter being formed to fit into and with a cage at the bottom of the second device. The second device has a plurality of articulated clamping jaws which the operator operates into gripping engagement with the cable, and by raising the second device from the ship, a length of the cable is brought to the water surface. The cable may be cut by the operator before the length is raised.

37 Claims, 8 Drawing Figures

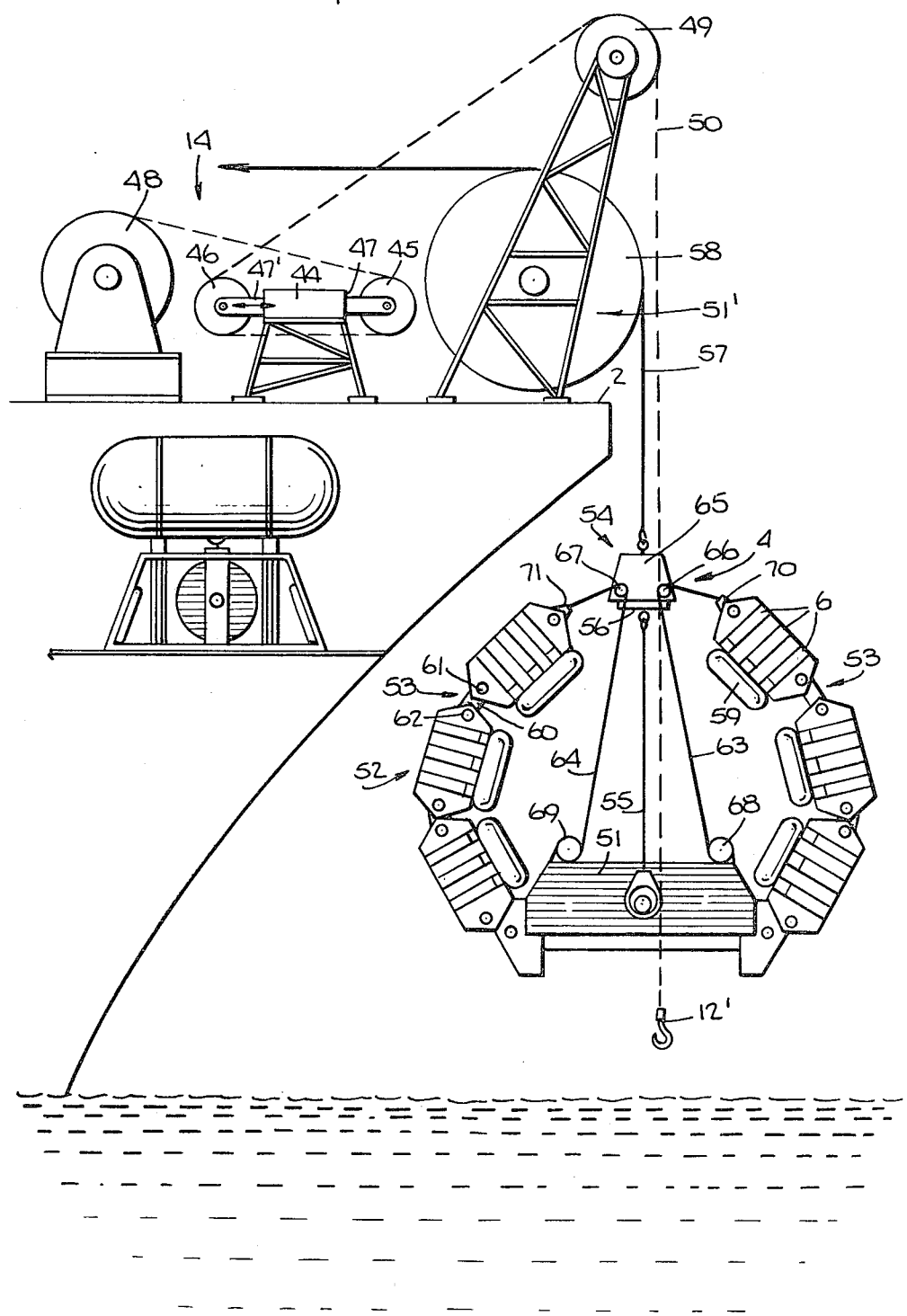

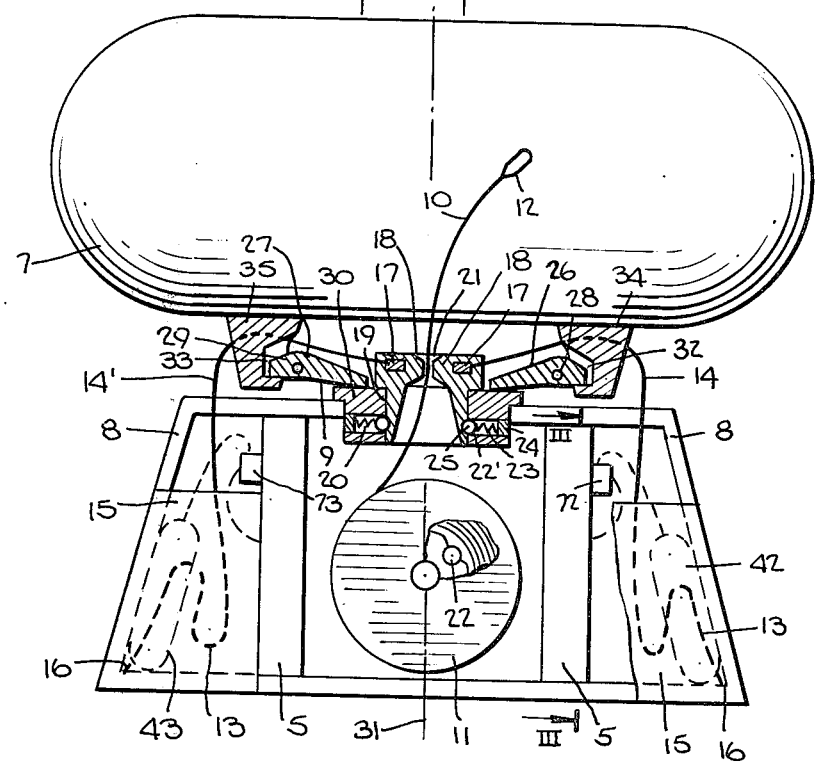
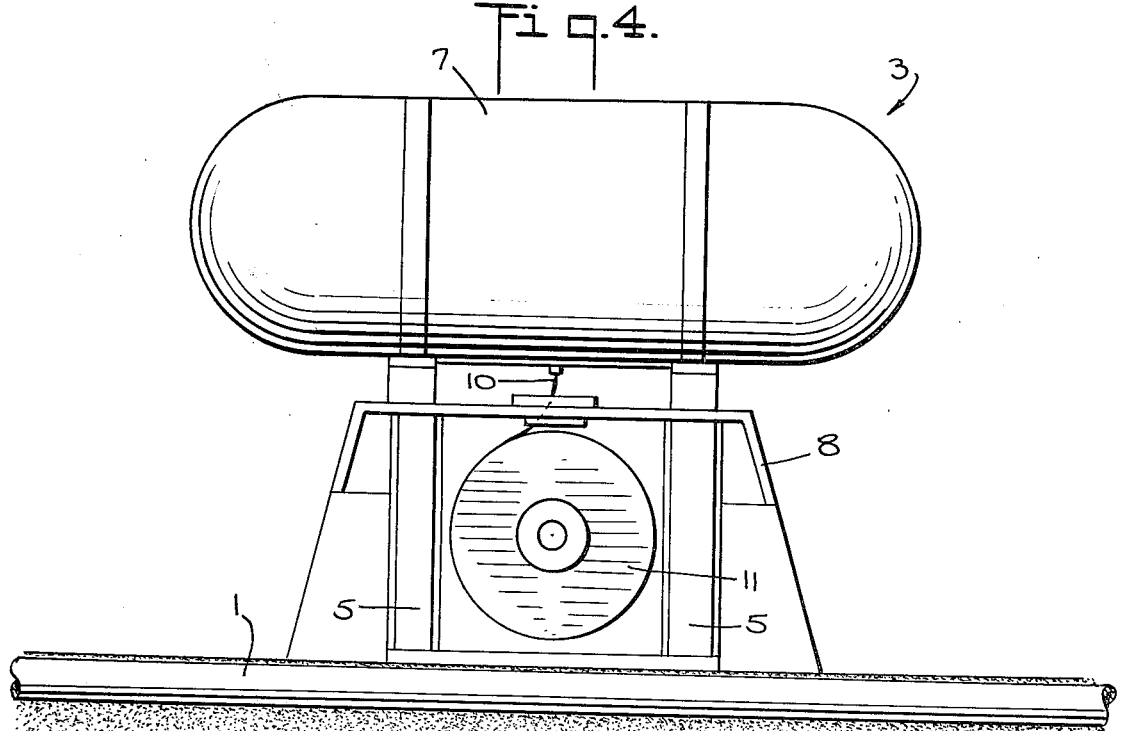

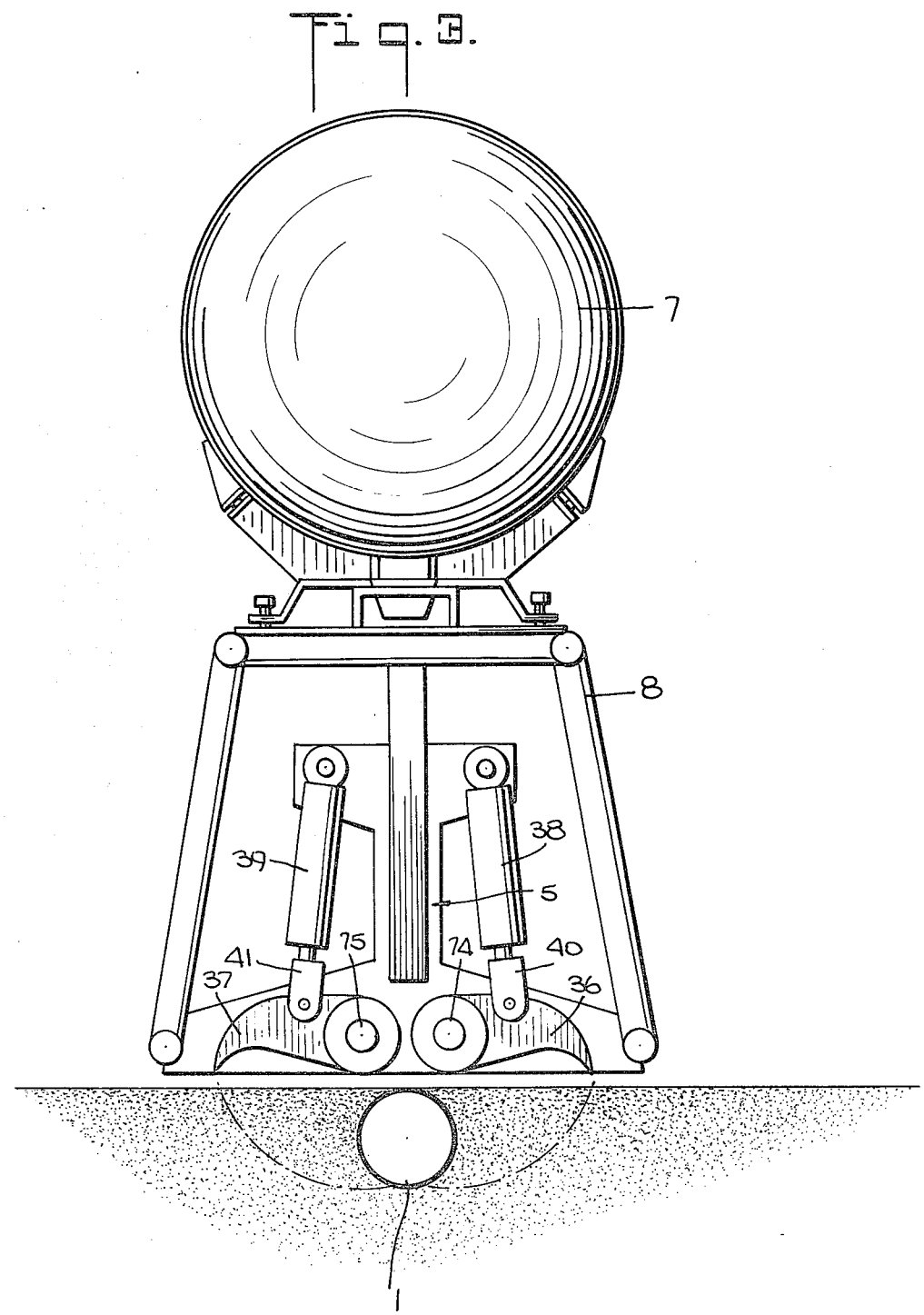

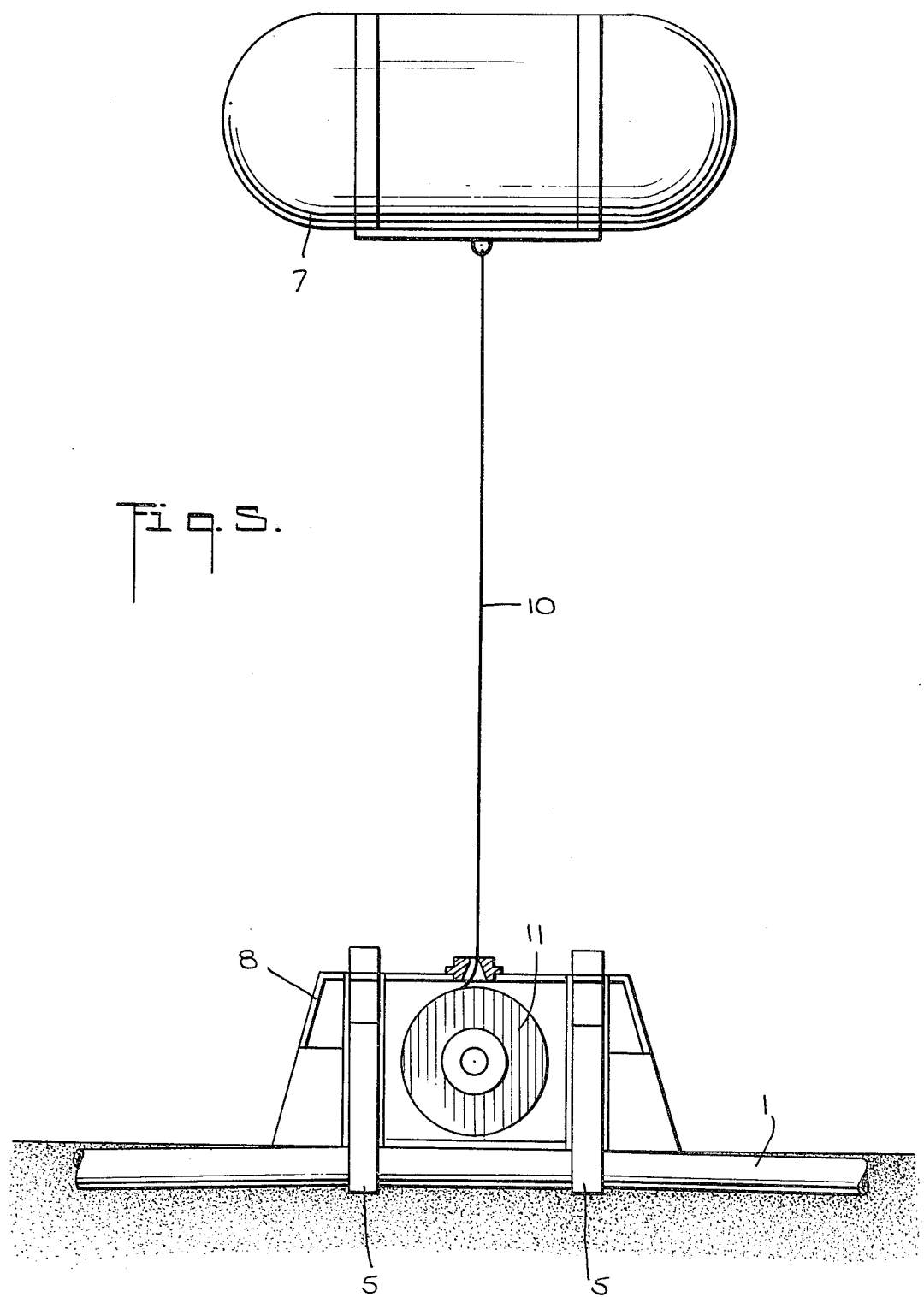

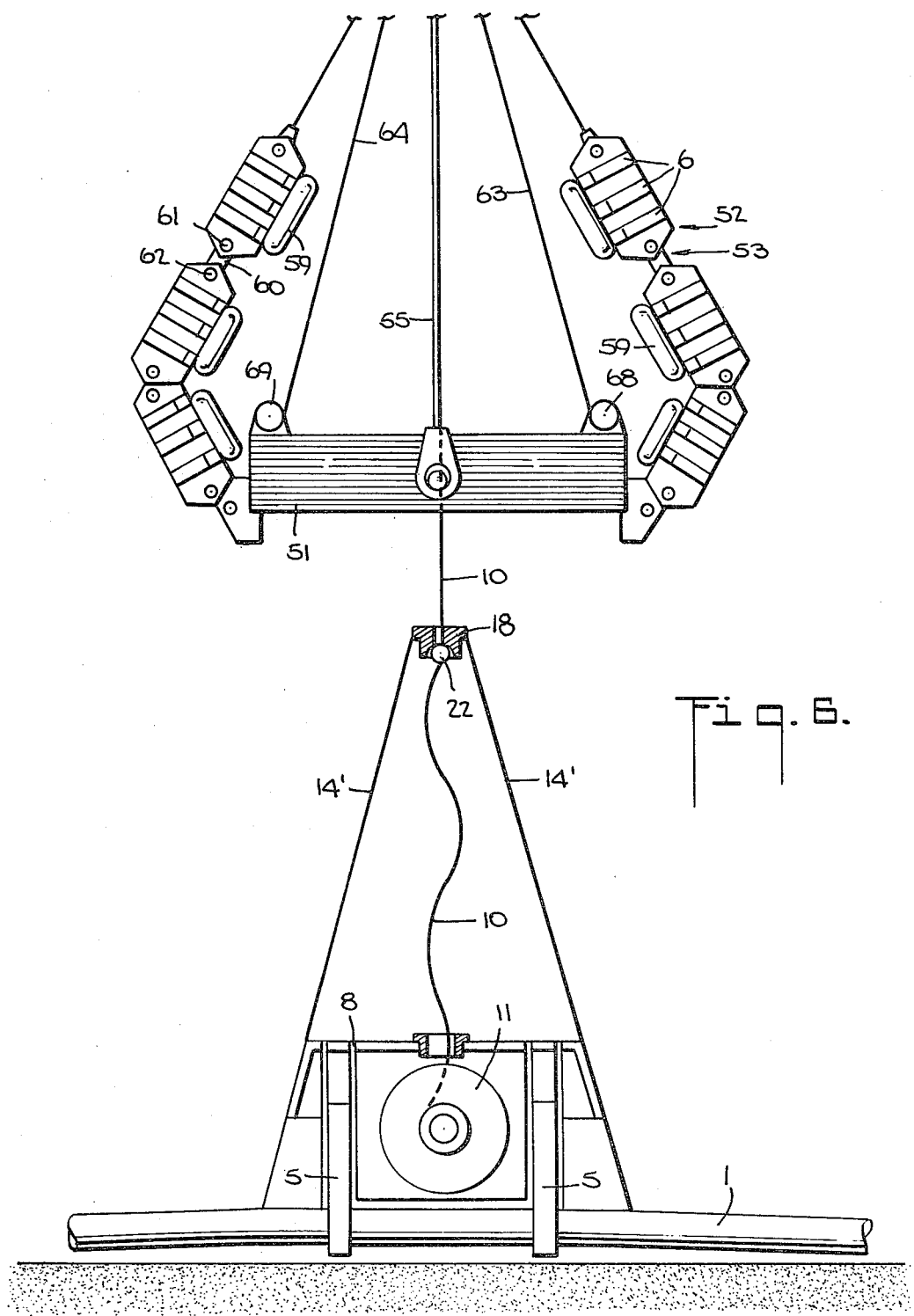

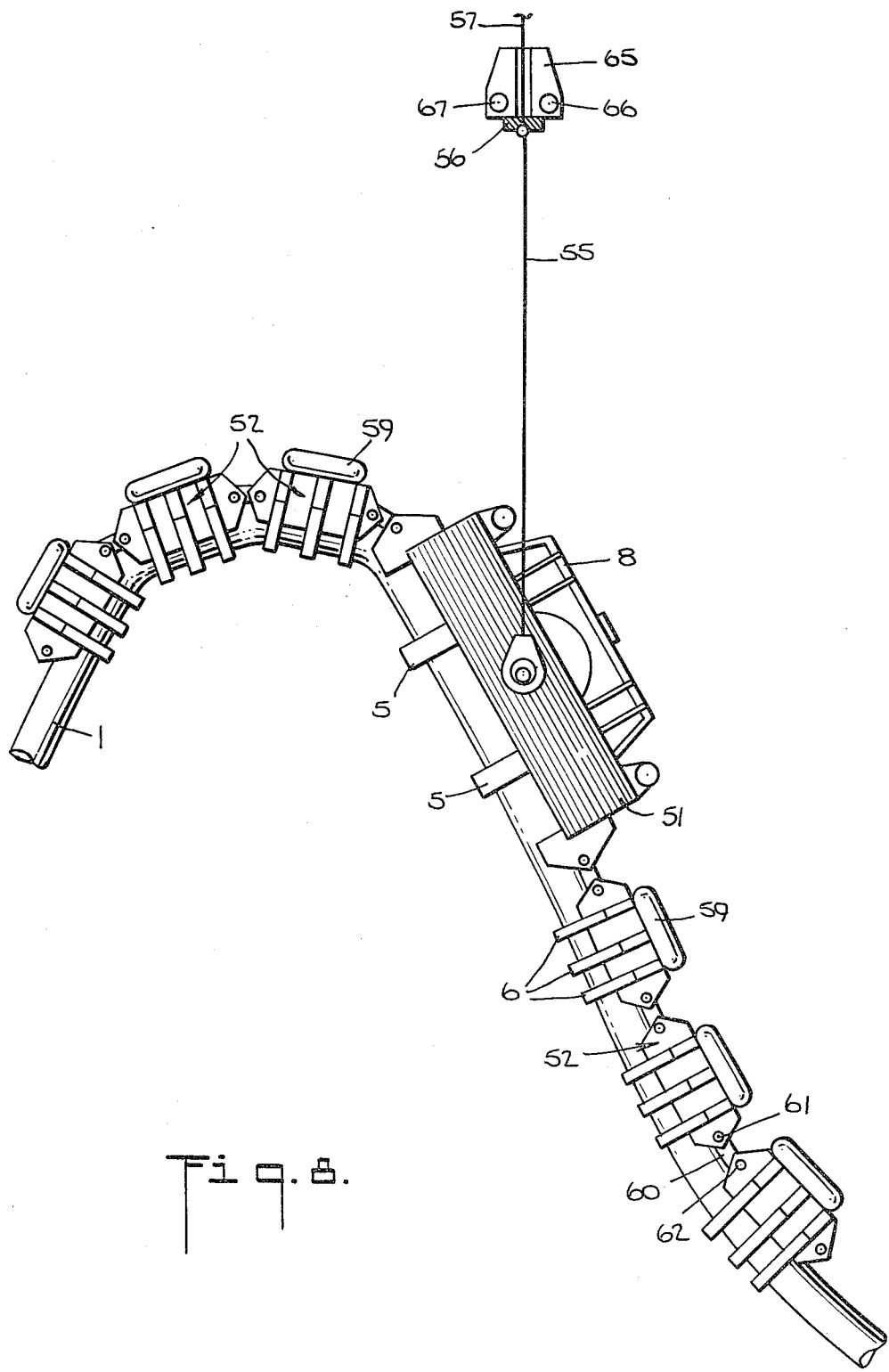

METHOD AND APPARATUS FOR RECOVERING A LENGTH OF AN ELONGATED BODY, SUBMERGED IN WATER

The present invention relates to a method and to apparatus for recovering a length of an elongated body, such as a pipe, a submarine electric cable or the like, and in particular, the invention relates to the recovery of a submarine cable lying several hundred meters under the free surface of a body of water, for example, at a depth of 500 meters.

It is known to use elongated bodies, laid under the free surface of the water, for connecting two terminals at a great distance from each other and arranged on the land, such bodies may be suitable for conveying fluids, transmitting electric signals or electric power. The present stage of modern techniques permits, on the whole, a continuous and reliable working of the installations using such bodies.

However, there are unforeseeable circumstances which can and do cause working anomalies or such damage as to make it necessary to recover a length of the elongated body for examining the type of failure and/or for repairing it. For example, it could happen that the body could be damaged by the passage of a ship during the laying of a submarine cable.

Moreover, in many cases, the Company which will make use of the plant, will ask the manufacturer to provide a suitable system for recovering the elongated body at any depth that it has been laid in order to permit examination, or repair, in the event of faulty operation or damage.

In general, it can be stated that the recovering of an elongated body is usually accomplished by frogmen equipped with manually maneuverable means, at least for realising a first connection, which permits the subsequent lifting of the length to be repaired with means having more power and arranged on a suitable watercraft at the surface of the water. However, it is understandable how the underwater activity of said frogmen is made difficult by the place where they work and therefore, the recovering operations easily are applicable only to depths in which the pressures involved are not excessive for the operator safety.

In order to overcome said difficulties, it is possible to use particular underwater means, such as, for example, a small submarine, in which the operator, with the help of hand-like grips or mobile arms extending from the submarine, performs the recovery operations. However, the problem is far from being solved even with the use of such means. In fact, said underwater means are of very small dimensions and permit only a modest operating activity which in any event is insufficient for a completely recovering a cable.

Moreover, said underwater means are not suitable for transporting apparatuses of a weight necessary for recovering, for example, lengths of a submarine cable lying on sea-bottoms at depths of several hundred meters with a total weight to be brought to the surface, of the order of magnitude from tons up to tens of tons.

Therefore, all the solutions known up to now are unsatisfactory and the object of the present invention is to provide a method and apparatus for recovering an elongated body which do not have the drawbacks mentioned hereinbefore.

One object of the present invention is a method for recovering a length of an elongated body, such as a pipe, electric cable or the like, lying on the sea-bottom, at a substantial distance from the free surface of the water, characterized by the steps of:

(a) lowering towards the sea-bottom an apparatus containing a first mechanical system providing the forces necessary for merely gripping the elongated body;

(b) controlling the descent of the apparatus with the application of a balancing force in the direction opposite to the weight of the apparatus, said force being exerted by a float bound to the apparatus by means of a rope, chain or similar binding element, gathered inside the apparatus as turns of the element;

(c) guiding and positioning said apparatus on the length of the elongated body to be recovered;

(d) causing the float to ascend the free surface of the water producing, in this way, the unwinding of the turns of the binding element of the float within the apparatus;

(e) lowering, along the path which is determined by the binding element and which is between the free surface of the water and apparatus placed on the sea-bottom, a further mechanical system providing forces suitable for gripping the elongated body and clamping onto said elongated body;

(f) lifting the length of elongated body to the free surface of the water by means of the further mechanical system.

In substance, this method is based on the operation of subsequently assembling at the sea-bottom two different forces suitable for gripping the elongated body in three steps, such steps comprising:

(1) A first step during which an apparatus comprising a float and provided with a first mechanical system with forces sufficient for gripping the cable, is lowered towards the sea-bottom at any depth, in a balanced condition with respect to buoyancy and weight. Consequently, as result of the balanced condition, the apparatus is easily maneuvered and may be guided in the descent towards the sea-bottom by suitable underwater means, for example, a small submarine, whose task is only that of directing the apparatus towards the elongated body as it approaches the bottom;

(2) A second step during which the float ascends to the free surface of the water and unwinds a rope, a thread, or the like, connected to the apparatus. In this step, the ascent of the float accomplishes two functions, one essential for the subsequent recovering operations since the rope locates at the surface the position of the elongated body at whatever depth it lies and the other particularly useful for a secure first connection to the body to be recovered, since the apparatus which is at the bottom is no longer subject to the upward force of the float and presses firmly, with all its weight, against the longitudinal body and makes easy the application of the mechanical forces suitable for gripping the body in question;

(3) A third step, during which a further mechanical system providing forces suitable for gripping the length to be recovered is lowered vertically to the elongated body and along the rope unwound during the second step by the float during its ascent. Therefore, by means of this step, it is possible to lower towards the bottom any structure, which may be of considerable weight and maneuvered from above on a suitable watercraft, leaving to the underwater means near the body to be recovered only very simple maneuvers for regulating said structure.

The method is particularly suitable for recovering a length of a submarine oil-filled electric cable lying at a depth of several hundred meters under the free surface of the water, and, in this case, before steps (a) to (f), the following steps are performed:

(g) cutting the cable into two parts;
(h) continuing the sending of fluid oil under pressure into the part of the cable which it is desired to recover.

A further object of the invention is apparatus for recovering a length of an elongated body, such as a pipe, electric cable or the like, lying on a sea-bottom at a substantial distance from the free surface of the water, characterized by the fact of comprising at least two different types of equipment each being provided with means for gripping the elongated body and each being associated with a suitable watercraft. The first type of equipment comprises a float, an envelope supporting the gripping means, binding means for connecting the float to the envelope, such as a rope, a thread, a chain or a similar connecting element, of a greater length than the distance existing between the free surface of the water and the sea-bottom. Said connecting element has one end connected to the float and the other end connected to the envelope, and said float, when the first type of equipment is detached from the watercraft and immersed into the water, produces a thrust, or buoyancy force, directed upward which corresponds to the weight of the first equipment. Said connecting element, rope, thread or chain constitutes a guiding means for the lowering of the second type of equipment from the free surface of the water towards the sea-bottom after said binding means are activated to release the float from the envelope thereby causing the ascent of the float to the free surface of the water.

Other objects and advantages of the present invention will be apparent from the following detailed description of the presently preferred embodiments thereof, which description should be considered in conjunction with the accompanying drawings in which:

FIG. 1 illustrates schematically the apparatus of the invention arranged on a suitable watercraft;

FIG. 3 is an end view of a portion of the apparatus shown in FIG. 2 and illustrates the means for gripping an elongated body, FIG. 3 being taken along the plane III—III of FIG. 2;

FIGS. 4, 5 are side elevation views illustrating two steps subsequent to the lowering of the first equipment onto a cable;

FIGS. 6 and 7 are side elevation views illustrating two steps involving the second type of equipment respectively, before the laying of the second equipment on the cable, and as the second equipment clamps the cable; and FIG. 8 represents the lifting of the cable by means of the second equipment.

Figure 2:
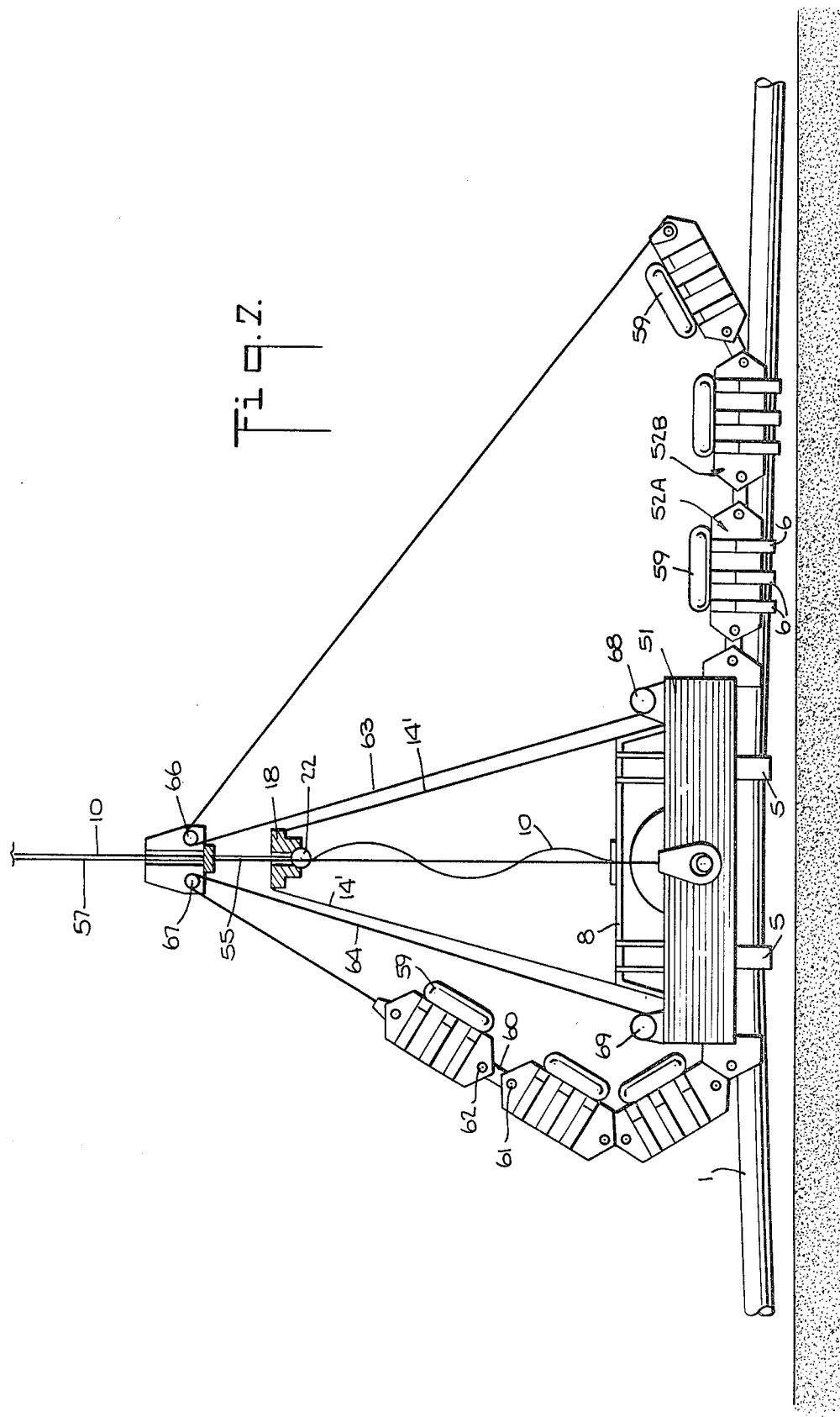
FIG. 2 illustrates, in transversal section, the apparatus, or first equipment, which is initially lowered.

The invention will now be described, by way of example, in connection with the recovery of a length of an oil filled submarine cable 1 (FIGS. 3–8) lying on a sea-bottom at a depth of about 500 meters from the free surface of the water, where a watercraft 2 (FIG. 1) is already present.

The recovery apparatus, constituted by two units 3 and 4 of the apparatus is associated with said watercraft 2, each of said units 3 and 4 being provided with gripping means 5, 6.

The first unit 3 is designed to be lowered towards the sea-bottom without any connection with the watercraft 2 and is controlled only by underwater means, such as a submarine, provided with suitable hand-like grips or mobile arms for simple operations performed by an operator inside said means. This unit constitutes the means for locating the cable length to be recovered and permits, as will be explained hereinafter, the succeeding descent of the second unit and of the apparatus designed for the actual lifting of the length of the cable 1 to the watercraft 2.

The apparatus unit 3 comprises (see FIG. 2) a float 7, an envelope 8, means 9 for connecting the float 7 to the envelope 8, a rope 10 of a length greater than the distance between free surface of the water and sea-bottom, wound around a spool 11 inside the envelope 8, with the first end 12 connected to the float 7, and means 13 for centering the second apparatus unit 4 on the first apparatus unit 3, the means being pulled out of the envelope 8 when the float 7 ascends from the sea-bottom to the free surface of the water and unwinds the rope 10. Elastic pulling means 14 (FIG. 1) arranged on the watercraft 2 and adapted to keep the rope 10 under tension and to avoid tearing thereof in consequence of oscillations to which the watercraft 2 can be subjected, is connected by the hook or clamp $12^1$ to the end 12 of the rope 10 when the end 12 of the rope is detached from the float 7, the clamp $12^1$ being arranged at one end of a suitable filiform connection, explained later on, which passes through the second apparatus unit 4.

The float 7 is selected in such a way as to give a thrust due to buoyancy directed upward equal to the weight of the first apparatus unit 3 which comprises both the weight of the float 7 and the weight of the envelope 8 and its associated parts. Preferably, the float 7 is made of a wooden material or of polyurethane foam resistant to a pressure up to 50–60 $kg/cm^2$ and with a specific gravity of about 0.5 $gr/cm^3$. By way of example, a float 7 having such overall dimensions as to displace, when immersed, a total volume of 800 liters of water and associated with an envelope 8 whose weight with its content is about 400 kg is indicated as suitable for the purposes of the invention.

In order to keep the first unit 3 in equilibrium conditions during its descent towards the sea-bottom, the wooden material of the float 7 is covered with an elastic, waterproof layer, for example of elastomeric material, in such a way as not to change the specific gravity of the float 7 in consequence of the absorption of water as the hydrostatic pressure increases with the descent of the unit 3 towards the sea-bottom.

The centering means 13 comprises a plurality of cords $14^1$ gathered in appropriate pockets 15 of the envelope 8 with first ends 16 thereof connected to points of the envelope and second ends 17 thereof connected to a plug 18 inserted in a central seat 19 of the envelope and retained therein by retaining means 20. The plug 18 is provided with a central hole 21 through which the rope 10 passes as it unwinds during the ascent of the float 7.

The centering means 13 also comprises a spherical body 22, with a diameter greater than the hole 21 in the plug 18 and firmly secured to a part of the rope 10 very near to the end thereof attached to the spool 11 so that the same unwinding of the rope 11 drags the spherical body 22 into abutment with the surface of the plug 18 delimiting the hole 21 at which time a force directed upwardly exerted along the rope 10 overcomes the force of the retaining means 20 causing removal of the plug 18 from the seat 19 of the envelope 8 and stretching of the plurality of cords 14'.

The cords 14' are of the same number as the envelope corners. For example, if the envelope 8 has the shape of a truncated pyramid with hexagonal bases, the cords 14' are six in number so that their unwinding from the pockets 15 when the plug 18 comes out of the seat 19, constitutes the prolongations of the envelope corners producing, therefore, a complete pyramid forming the centering means of the second unit 4 on the first unit 3.

The retaining means 20 for the plug 18 and the means for binding the float 7 to the envelope 8, can be of various kinds. In a preferred embodiment, each of the retaining means 20 for the plug 18 comprises a sphere 22', a spring 23, a slot 24 for the spring 23 in the seat 19 of the envelope 8, and a cavity 25 in the plug 18. In this case, the spring 23 pushes the sphere 22' into the cavity 25 preventing the detachment of the plug 18 from the seat as long as the spherical body 22 does not abut the plug 18, as described.

Also, in the same preferred embodiment, the means for binding the float 7 to the envelope 8 comprise two levers 26, 27 with pivots 28, 29 on the envelope 8 and a plate 30 rotable around the central axis 31 of the envelope 8 and provided with two radial openings (not visible). The levers 26, 27 have their ends inserted in the cavities 32, 33 in the appendixes 34, 35 of the float 7 and have their opposite ends in abutment with the surface of the plate 30.

When the plate 30 is rotated around the axis 31, by means of the submarine hand-like grips, the opposite ends of the levers 26, 27 drops into the radial openings of the plate 30 causing with the rotation of the levers 26 and 27 themselves around the pivots 28, 29 and withdrawal of the ends of the levers 26 and 27 from the cavities 32, 33. When this happens, the float is detached from the envelope 8, which is already laid on the length of cable 1 to be recovered, and therefore, the entire weight of the envelope 8 and its parts bears on the cable 1. It is then possible to effect the first linking to the cable 1 by means of the gripping means of the first unit 3.

Said gripping means 5, according to an embodiment of the present invention (FIG. 3) comprises at least two pairs of jaws, jaws 36, 37 being shown in FIG. 3, of a material suitable to be used on sea-bottoms and driving means constituted by pneumatic piston and cylinder assemblies 38, 39 whose stems 40, 41 are connected to the jaws 36 and 37 as is clearly shown in FIG. 3. The assemblies 38 and 39 may be fed with air under pressure coming from bottles 42, 43 (FIG. 2).

The profile of the jaws 36, 37, etc., can be chosen as to penetrate into the material of the sea-bottom and also to permit the recovering of a cable length laid under the sea-bottom. Moreover, the two pairs of jaws can have the only function of surrounding the cable without clamping it, leaving said task to the second unit 4.

Preferably, the gripping means 5 of the first unit 3 merely make a first connection with the body to be recovered, and the position of the body is identified on the surface by the float 7 which has, during its ascent, pulled with it the rope 10 integral with the envelope 8 anchored to the sea-bottom.

The rope 10 is then, in turn, detached from the float 7 and its extremity 12 is attached to the elastic pulling means 14 whose presence guarantees the arrangement of the rope 10 according to a vertical line with respect to the sea-bottom, and the rope 10 constitutes, therefore, a precise guiding means for the succeeding descent of the second unit 4 towards the cable 1.

The pulling means 14 arranged on the watercraft 2 are known, and for example, as schematically indicated in FIG. 1, said means 14 comprise a fluid, dynamic drive 44, two pluralities of pulleys 45, 46 (only two are shown in FIG. 1), of corresponding number, associated respectively with the cylinder 47 and with the stem 47' of the drive 44, a driven drum unit 48 and a transmission pulley 49 downstream of the drive 44.

In this case, the rope 10, detached from the float 7, is connected by means of the clamp 12' to a further length of rope 50 passing through the unit 41. In turn, the rope 50 passes onto the upper part of the transmission pulley 49 and winds, at first, around the pulley 46, then, around the pulley 45 and at least around the drum of the drawing unit 48.

The fluid, dynamic drive 44 is of the type in which the variation of the stem stroke between a minimum and a maximum value produces small variations of pressure in the cylinder 44 and, therefore, of the stress on the rope 10.

The second apparatus unit 4 (FIGS. 1 and 6-8) will now be described. Said unit 4 comprises a central cage 51, means 51' for causing the descent and the ascent of the cage 51 from the watercraft 2 towards the sea-bottom and vice versa, a plurality of clamping devices 52 associated with the sides of the cage 51, each device 52 having a base surface corresponding to the periphery of the cable 1 and have its own means for gripping the cable, connecting means 53 between the clamping devices 52, and tensioning means 54 for producing, as it will be more evident later on and in one of the preferred embodiments, the laying of said devices 52 on the cable 1 according to a regular sequence and alignment.

The central cage 51 has the shape of a truncated pyramid having hexagonal bases with a contour corresponding exactly to that of the envelope 8 of the first unit 3 where said cage must be applied.

The means 51' necessary for the ascent and descent of the cage comprises a plurality of ropes associated with the cage 51, for example two ropes 55 connected to the opposite sides of the cage 55 (only one side is represented in the figures), a support 56 to which the convergent ends of the ropes 55 are fixed, a third rope 57 bound to the support 56 (see FIG. 8), or to parts integral with the latter (see FIG. 1), and placed under tension by a winch 58 arranged on the watercraft 2.

The clamping devices 52 constitute the part of the second apparatus part 4 necessary for the final gripping of the cable length to be recovered, and for this purpose, the gripping means 6 are provided. Said gripping means 6 are substantially constituted by pairs of jaws put into operation through pneumatic systems fed from bottles 59 (see FIG. 1) with mechanisms practically the same as, or equivalent to, those shown in FIG. 3 for the first unit 3. In particular, for space reasons, one can use pairs of jaws, the jaws of each couple rotating in two planes offset and parallel with each other, both planes being perpendicular to the cable axis. For example, each clamping device 52 can comprise three pairs of said jaws and the jaws can be rotated by piston and cylinder assemblies, like the piston and cylinder assemblies 38 and 39, and fed from the air bottles 59.

The connecting means 53 arranged between the clamping devices 52, in a preferred embodiment, are constructed in such a way as to permit the oscillation of a device 52 with respect to the contiguous one only in a single plane containing the cable axis. This solution is, in particular, applicable for clamping the cables laid according to a single rectilinear direction. For other cables it is possible to provide clamping devices connected to one another by means of articulated joints or other systems which permit said devices to be applied also on cable lengths laid with variations of direction relative to the axis. In the example, of FIG. 1, said connecting means 53 comprises a lever 60 connected to the contiguous devices 52 by means of pins 61 and 62.

The tensioning means 54 comprises two cords 63, 64, an element 65 suitable for supporting the two transmission pulleys 66, 67 and secured to the rope 57 of the means 51' for the ascent and descent of the cage 51. It also comprises two collecting pulleys 68, 69 on the cage 51. The cords 63, 64 are connected by the ends 70, 71 to the two outermost clamping devices 52 alongside the element 65, and then, they pass over the transmission pulleys 66, 67 of the supporting element 65 to wind at last on the collecting pulleys 68, 69 rotating around their axes according to the turns transmitted to them by suitable cranks (not shown) and driven by means of suitable mobile arms arranged on the underwater means. Thus, by rotating the pulleys 68 and 69, it is possible to change from the resting configuration of FIG. 1 into the operative one represented in FIG. 7 for a gradual laying of the devices 52 on the cable 1.

The working of the apparatus for recovering a length of oil-fluid submarine cable lying on a sea-bottom and cut into two parts by means of appropriate cutting means of a known type, for example, shears or the like, maneuvered at a distance by mobile arms of underwater means, such as a small submarine having an operator at the inside thereof will now be described. In the example to be described, it will be assumed that it is desired to lift to the surface of the water a length of the first part of a cable 1 having a zone which has been damaged, for some reason, in order to examine the failure.

This first cable part continues to be fed with fluid oil under pressure from the sealing end, placed on the land, up to the cut section in order to prevent the entrance of water into the section itself. The recovering steps take place as follows:

(1) The first unit 3 (FIG. 1), detached from the watercraft 2, is lowered towards the sea-bottom in equilibrium conditions in consequence of the presence of the float 7 with a buoyancy corresponding to the apparatus weight. During this step the envelope 8, containing the means 5 for gripping the cable 1, is kept in position with the help of controls arranged on the submarine, and as the envelope 8, guided by the submarine operator, gets near the sea-bottom and the operative zone, the envelope 8 is adjusted in position and laid on the cable length to be recovered (see FIGS. 3 and 4).

(2) Subsequently, with a maneuver made by the submarine, the binding means 9 for securing the float 7 to the envelope 8 are released by rotating the plate 30 around the axis 31 until the radial openings of the plate 30 are in correspondence with levers 26, 27 causing the release of the appendixes 34, 35 and of the float 7 and consequently, the ascent of the float 7 towards the free surface of the water (FIG. 5). As the float 7 ascends, the rope 10 unwinds passing through the hole 21 of the plug 18 (FIG. 2).

In consequence of the detachment of the float 7, the force directed upward 1 by the float 7 on the first unit 3 ceases with the favorable result of strengthening, with its weight, the pressing of the envelope 8 on the cable 1 and, therefore, of providing a stable, relatively heavy platform for the actuation of the gripping means 5 (FIG. 5).

The maneuver of the gripping means 5 is made by means of simple maneuvers effected by the operator in the submarine through maneuvering arms which actuate the valves 72, 73 (FIG. 2) to feed, with air under pressure, coming from the bottles 42, 43, the pneumatic controls 38, 39 (FIG. 3) of the two pairs of jaws 36, 37 etc. whose rotation around the pivots 74, 75 produces (as shown in FIG. 3 with dashed lines) the first linking of the recovery apparatus with the cable 1.

The presence of the two pairs of jaws 36, 37, etc. constitutes an advantageous feature of the apparatus since the incomplete working of a pair, owing, for example, to a sea-bottom particularly resistant to the digging action of the jaws, can be compensated by the action of the second pair of jaws.

The rope 10, pulled by the float 7, unwinds its turns from the spool 11 (FIG. 2) around which it is gathered, and pulls the spherical body 22, secured to the rope 10, into abutment with the surface circumscribing the hole 21 of the plug 18 and causes, with a force directed upward along the rope 10 itself, the release of the plug 18 from the seat 19 by overcoming the force of the retaining means 20. In operation, the tension applied to the rope 10 is transmitted through the spherical body 22 to the plug 18 which slides along the walls of the seat 19, the pressure on the sphere 22' causing it to enter into the slot 24 of the seat 19 by overcoming the resistance of the opposing spring 23.

When the plug 18 comes out of the seat 19, it pulls the six cords 14', causing them to unwind from the pockets 15 of the envelope 8 where said cords are gathered up and causing them to assume the pyramid configuration shown in the lower part of FIG. 6, a configuration appropriate to constitute the centering element for the second unit 4. Therefore, in this step, the ascent of the float 7 to the surface accomplishes two functions. Through the unwinding of the rope 10, the centering means for the subsequently lowered apparatus is set up, and because the float 7 is on the water surface, it identifies the position of the cable 1 at a depth of hundreds of meters from the free surface of the water.

In a further step, the rope 10 is detached from the float 7, and the end 12 of the rope 10 is secured to the clamp 12' of the rope 50 (said clamp 12' and said rope 50 passing through the support 56 and the element 65 of the second apparatus; see FIG. 1). Finally, the rope 10 is tightened with the pulling means 14 arranged on the watercraft 2 by actuating the pulling unit 48 so that the rope 10 between spherical body 22 and free surface of the water extends in a direction vertical to the sea-bottom (FIG. 6). The length of rope 10 between spherical body 22 and spool 11 is loose, as shown in FIG. 6, so as to guarantee equal tensile stresses in the six cords 14'.

The tension to which the rope 10 is subjected is that imposed by the pressure of the fluid flowing inside the fluid, dynamic control 44. Such control 44 acts to permit, in a known way and through the displacement in the two directions of the stem 47' with which the pulleys 46 are associated, reaction to the stress variations caused by the oscillation of the watercraft 2 so that the rope 10 is subjected to a substantially constant tension.

The steps relating to the descent of the second unit 4 towards the sea-bottom will now be described. The said second unit 4 is lowered by means of the cage 51 (FIG. 1) suspended by the rope 57 moved by the winch 58 placed on the watercraft 2. The clamping devices 52 are arranged like a collar, in consequence of the action exerted by the tensioning means 54 (FIG. 6) through the cords 63, 64 wound around the pulleys 68, 69.

The lowering step of the second unit 4 is accomplished by setting the winch 58 in action, and said lowering takes place along a line vertical to the cable 1 on the guiding means represented by the rope 10 of the first unit 3. This step is carried out with great accuracy and permits the second unit 4 to settle onto, and to center with respect to, the first apparatus part 3.

In fact, even if the cage 51 should rotate around its supporting rope 57 before reaching the sea-bottom, the desired settlement occurs, all the same, since the inner contour of the cage 51 corresponds to the profile determined by the cords 14' placed under equal tension by the rope 10 connected to the pulling means 14 on the watercraft 2. Therefore, at the end of the descent of the second apparatus part 4 an automatic application of the cage 51 onto the envelope 8, already positioned on the cable (FIG. 7), takes place. Furthermore, if necessary, the angular position of the cage 51 around the rope 10 can be adjusted by the submarine operator as the cage 51 is lowered.

The characteristics of the connections 53 between the clamping devices 52, through the levers 60, cause alignment of said devices 52 with the cable 1 after the cage 51 is properly positioned. This condition is particularly advantageous since easy operations, made by way of maneuvering arms by the operator in the submarine, permit operation of the tensioning means 54 causing, with the rotation of the pulleys 68, 69, a gradual and precise laying of the clamping devices 52 on the cable 1, as is clearly shown on the right side of FIG. 7.

Substantially, the operator rotates the two pulleys 68, 69 so that a first clamping device 52A is placed on the cable. The operator then opens the valve of the bottle 59 of such device to actuate the related means 6 causing it to grip the cable 1 and subsequently, only after being sure of the desired gripping of the cable 1, the operator acts on a further clamping device 52B increasing, for example, the length of the cord 63, without following carefully the alignment of the second device 52B, because alignment, as already stated, is predetermined, since the levers 60 between the devices 52A and 52B restricts the movement of the second device 52B to a single plane.

Proceeding in this way, the complete linking of the clamping devices 52 is obtained with pressures advantageously distributed and not localized on the cable 1 and therefore, the lifting of the cable length to be recovered is started (FIG. 8) through the actuation of the winch 58 up to the placement of the cable length onto the watercraft 2.

FIG. 8, relating to the lifting of the cable 1 does not show the cords 63 and 64 and the rope 10 since they are not necessary in this last step.

At last, with known procedures, the details of which are omitted since they do not form part of the invention, the zone where the cable failure happened is examined and other usual operations are carried into effect, such as, for example, the elimination of the failure, the formation of a joint and connection with other reserve cable lengths arranged on the watercraft 2.

From the explanation of the operation of the apparatus, it will be understood that the advantage of recovering a cable length and bringing it to the water surface from a sea-bottom at a great depth is accomplished by means of automatic operations. In fact, as already seen, the first unit 3 is lowered towards the sea-bottom in equilibrium conditions, and this involves only settling into position with respect to the cable position. The second unit 4 is lowered along the line vertical to the cable 1 located by the first unit 3 and adjusts itself with respect to the latter alone. The intervention of the operator that results is, therefore, limited to small maneuvers effected in the inside of a submarine or to easy operations carried out on the watercraft 2.

In practice, by means of this invention, it is possible to overcome the difficulties and the impossibility noted in the past of lowering very heavy and complicated recovering means from a watercraft towards the sea-bottom at a depth of 500 and more meters, into a zone which cannot be seen from the surface of the water and where a cable to be recovered is lying and where the hydrostatic pressures are such as to exclude the intervention of frogmen.

Although preferred embodiments of the present invention have been described and illustrated, it will be apparent to those skilled in the art that various modifications may be made without departing from the principles of the invention. For example, the invention can be applied to the recovery of electric cables different from that described in the example, e.g. of the telephone type or of pipes or conduits.

What is claimed is:

1. Method for recovering a length of an elongated body from substantial depths below the free surface of a body of water, said method comprising:
    lowering in said water a first unit having a float detachably secured to means for gripping said length and having a flexible, extensible element interconnecting the float and said means;
    controlling the descent of said unit by applying a balancing force substantially equal to and opposing the force exerted by the weight of said unit, said balancing force being exerted by said float;
    guiding and positioning said unit over said length;
    detaching said float from said means while leaving them interconnected by said element, whereby said float ascends to said surface and extends said element;
    operating said gripping means to cause it to grip said length;
    with said first unit still in place with its gripping means gripping said length, lowering a second unit along said element to said first unit, said second unit also having gripping means for gripping said length and said second unit being lowered along said element to a position such that said last-mentioned gripping means can grip said length;
    operating said last-mentioned gripping means to cause it to grip said length; and
    raising both said first unit and said second unit with said length gripped thereby.

2. A method as set forth in claim 1 wherein said second unit has a bottom with a cavity having a predetermined shape and wherein said first unit has further extensible elements which may be extended into a shape which interfits with said cavity, said method further comprising extending said further extensible means by said float as it ascends, whereby said further extensible means are received within said cavity and guides said second unit as it is lowered.

3. A method as set forth in claim 2 wherein said further extensible elements are flexible and are raised by said float into positions defining a tapered solid which is narrower at its upper end.

4. A method as set forth in claim 1, 2 or 3 wherein said body is an oil filled electric cable, said method further comprising cutting through said cable at one end of the length thereof to be raised to provide a free cable end prior to raising the length of the cable and supplying oil to said cable length under a pressure sufficient to prevent the entrance of water into said cable end after it has been cut.

5. Apparatus for recovering a length of an elongated body from substantial depths below the free surface of a body of water, said apparatus comprising:

a first unit comprising an envelope, a float detachably secured to said envelope, gripping means for gripping said length mounted on said envelope, and a flexible, extensible element attached at its ends respectively to said float and to said envelope, said element having a length when extended, at least substantially equal to the distance between said free surface and said length and said float providing a buoyancy force substantially equal to the effective weight of said unit in the water; and a second unit comprising a cage having an opening for receiving said element and having gripping means thereon for gripping said length, said second unit being lowerable along said element to said length.

6. Apparatus as set forth in claim 5 wherein said first unit comprises centering means on said envelope extensible upwardly therefrom when said float is detached from said envelope for guiding said second unit as it is lowered along said element.

7. Apparatus as set forth in claim 6 wherein said centering means is coupled to a portion of said element whereby said centering means is extended by said element when said float is detached from said envelope and ascends in the water.

8. Apparatus as set forth in claim 6 wherein said envelope has an outer surface which is non-circular in cross-section and has a plurality of corners and wherein said centering means comprises a coupling means through which said element passes and a plurality of cords extending from said coupling means to said corners, whereby said cords from extensions of said corners when they are extended by said element.

9. Apparatus as set forth in claim 8 wherein said coupling means comprises a plug with a through-hole mounted on a seat on said envelope, said plug being retained in said seat by pressure responsive retaining means, whereby said plug is released from said seat when the force applied thereto in the release direction exceeds a selected value, and wherein said element passes through said hole in said plug and has plug-engaging means secured thereon adjacent the end thereof remote from the end thereof secured to said float, whereby engagement of said plug-engaging means with said plug during the ascent of said float releases said plug from said seat.

10. Apparatus as set forth in claim 5 wherein said float is detachably secured to said envelope by a plate rotatably mounted on said envelope, a pair of levers pivotally mounted intermediate their ends on said envelope, each of said levers having one end thereof engaging a surface of said plate in a plane perpendicular to the axis of rotation thereof, and lever engaging means secured to said float and engaging the opposite ends of said levers when the one ends thereof engage said surface, said plate having openings therein at said surface thereof for permitting pivotal movement of said levers and disengagement of the opposite ends of said levers from said lever engaging means, when said openings are aligned, by rotation of said plate, with the one ends of said levers.

11. Apparatus as set forth in claim 5 wherein said gripping means of said first unit comprises a plurality of jaws pivotally mounted on said envelope for gripping said length and means for driving said jaws.

12. Apparatus as set forth in claim 11 wherein said means for driving said jaws comprises air operable cylinder and piston means acting between said envelope and said jaws and at least one air reservoir mounted on said envelope and connected to said cylinder and piston means.

13. Apparatus as set forth in claim 11 or 12 wherein the faces of said jaws engageable with said length are shaped to at least partly surround the periphery of said length when said jaws grip said length.

14. Apparatus as set forth in claim 11 or 12 wherein there are at least two pairs of jaws, one pair of said jaws being disposed at one side of the point of attachment of said element to said envelope and the other pair of said jaws being disposed at the other side of the point of attachment of said element to said envelope.

15. Apparatus as set forth in claim 5 or 6 further comprising tensioning means supportable on said surface of said water for engaging the end of said element which is attached to said float for stretching said element.

16. Apparatus as set forth in claim 15 wherein said tensioning means comprises a further flexible element having means at one end thereof for engaging said last-mentioned end of said first-mentioned element, a pulling unit engaging said further element for pulling the latter and fluid biassed pulleys intermediate said pulling unit and said means at one end of said further element, said further element passing over said pulleys for controlling the tension on said first-mentioned element and thereby compensating for movement of said pulling means relative to said first unit.

17. Apparatus as set forth in claim 5 wherein said gripping means of said second unit comprises a plurality of separately operable, gripping means at each side of said cage.

18. Apparatus as set forth in claim 17 wherein each of said plurality of gripping means is pivotally connected at one end to another of said last-mentined gripping means by linking means which limits pivotal movement of each said last-mentioned gripping means to substantially a single plane which is substantially vertical when said second unit is at said length.

19. Apparatus as set forth in claim 18 further comprising control means connected to said cage for pivoting said plurality of gripping means toward and away from the plane of the bottom of said cage whereby each of said plurality of gripping means may be brought successively into contact with said length.

20. Apparatus as set forth in claim 19 wherein said control means comprises a supporting element connected to and spaced from said cage, a pair of pulleys mounted on said supporting element, a pair of manually rotatable, collecting pulleys on said cage and a pair of cords, one of said cords extending from one of said collecting pulleys over one of said pulleys on said supporting element and to the gripping means at one side of said cage which is most remote therefrom and the other of said cords extending from the other of said collecting pulleys over the other of said pulleys on said supporting element and to the gripping means at the other side of said cage which is most remote therefrom, whereby rotation of a collecting pulley causes pivoting of the gripping means to which said last-mentioned collecting pulley is connected by a cord.

21. Apparatus as set forth in claim 20 wherein said supporting element is connected to said cage by cords connected to said cage and to said supporting element.

22. Apparatus as set forth in claim 21 further comprising means connected to said supporting element for connecting said supporting element to means for lowering and raising said second unit.

23. Apparatus as set forth in claim 17 wherein the spacing between the gripping means at one side of said cage and the spacing between the gripping means at the other side of said cage is at least equal to the dimension between the outermost sides of the gripping means of said first unit, whereby said gripping means of said first unit are between the gripping means at one side of said cage and the gripping means at the other side of said cage when said second unit is over said first unit.

24. Apparatus as set forth in claim 5 wherein said envelope has an outer surface which is non-circular in cross-section and wherein said cage has an interior cavity the wall of which mates with said outer surface of said envelope, whereby said envelope nests within said cavity when said cage is placed over said envelope.

25. Apparatus as set forth in claim 24 wherein the cross-section of said envelope is multi-lateral and the sides of said envelope taper inwardly in the upward direction.

26. Apparatus as set forth in claim 25 wherein said outer surface of said envelope corresponds to the surface of a hexagonal pyramid.

27. Method for recovering a length of an elongated body from substantial depths below the free surface of a body of water, said method comprising:
lowering in said water a first unit having a float detachably secured to means for gripping said length and having a flexible, extensible element interconnecting the float and said means;
guiding and positioning said unit over said length;
detaching said float from said means while leaving them interconnected by said element, whereby said float ascends to said surface and extends said element;
operating said means to cause it to grip said length;
lowering a second unit having gripping means to said length and along said element, said second unit having a bottom with a cavity having a predetermined shape and said first unit having further extensible elements which may be extended into a shape which interfits with said cavity;
extending said further extensible means by said float as it ascends, whereby said further extensible means are received within said cavity and guides said second unit as it is lowered;
operating said last-mentioned gripping means to cause it to grip said length; and
raising said second unit with said length gripped thereby.

28. A method as set forth in claim 27 wherein said further extensible elements are flexible and are raised by said float into positions defining a tapered solid which is narrower at its upper end.

29. A method as set forth in claim 27 or 28 wherein said body is an oil filled electric cable, said method further comprising cutting through said cable at one end of the length thereof to be raised to provide a free cable end prior to raising the length of the cable and supplying oil to said cable length under a pressure sufficient to prevent the entrance of water into said cable end after it has been cut.

30. A submersible unit for use in recovering a length of an elongated body from substantial depths below the free surface of a body of water, said unit comprising an envelope, said envelope having an outer surface which is non-circular in cross-section and has a plurality of corners, a float detachably secured to said envelope, gripping means for gripping said length mounted on said envelope, a flexible, extensible element attached at its ends respectively to said float and to said envelope, said element having a length when extended, at least substantially equal to the distance between said free surface and said length and said float providing a buoyancy force substantially equal to the effective weight of said unit in the water, and centering means on said envelope coupled to said element and extensible upwardly from said envelope when said float is detached from said envelope, said centering means comprising a coupling means through which said element passes and a plurality of cords extending from said coupling means to said corners of said envelope, whereby said cords form extensions of said corners when they are extended by said element.

31. A unit as set forth in claim 30 wherein said coupling means comprises a plug with a through-hole mounted on a seat on said envelope, said plug being retained in said seat by pressure responsive retaining means, whereby said plug is released from said seat when the force applied thereto in the release direction exceeds a selected value, and wherein said element passes through said hole in said plug and has plug engaging means secured thereon adjacent the end thereof remote from the end thereof secured to said float, whereby engagement of said plug-engaging means with said plug during the ascent of said float releases said plug from said seat.

32. A submersible unit for use in recovering a length of an elongated body from substantial depths below the free surface of a body of water, said unit comprising an envelope, a float detachably secured to said envelope by a plate rotatably mounted on said envelope, a pair of levers pivotally mounted intermediate their ends on said envelope, each of said levers having one end thereof engaging a surface of said plate in a plane perpendicular to the axis of rotation thereof, and lever engaging means secured to said float and engaging the opposite ends of said levers when the one ends thereof engage said surface, said plate having openings therein at said surface thereof for permitting pivotal movement of said levers and disengagement of the opposite ends of said levers from said lever engaging means, when said openings are aligned, by rotation of said plate, with the one ends of said levers, gripping means for gripping said length mounted on said envelope, and a flexible, extensible element attached at its ends respectively to said float and to said envelope, said element having a length when extended, at least substantially equal to the distance between said free surface and said length and said float providing a buoyancy force substantially equal to the effective weight of said unit in the water.

33. A submersible unit for recovering a length of an elongated body from substantial depths below the free surface of a body of water, said unit comprising a cage, and a plurality of separately operable, gripping means mounted on, and at each side of, said cage, each of said plurality of gripping means being pivotally connected at one end to another of said gripping means by linking means which limits pivotal movement of each said gripping means to substantially a single plate which is substantially vertical when said unit is at said length.

34. A unit as set forth in claim 33 further comprising control means connectfed to said cage for pivoting said plurality of gripping means toward and away from the plane of the bottom of said cage whereby each of said plurality of gripping means may be brought successively into contact with said length.

35. A unit as set forth in claim 34 wherein said control means comprises a supporting element connected to and spaced from said cage, a pair of pulleys mounted on said supporting element, a pair of manually rotatable, collecting pulleys on said cage and a pair of cords, one of said cords extending from one of said collecting pulleys over one of said pulleys on said supporting element and to the gripping means at one side of said cage which is most remote therefrom and the other of said cords extending from the other of said collecting pulleys over the other of said pulleys on said supporting element and to the gripping means at the other side of said cage which is most remote therefrom, whereby rotation of a collecting pulley causes pivoting of the gripping means to which said last-mentioned collecting pulley is connected by a cord.

36. A unit as set forth in claim 35 wherein said supporting element is connected to said cage by cords connected to said cage and to said supporting element.

37. A unit as set forth in claim 36 further comprising means connected to said supporting element for connecting said supporting element to means for lowering and raising said unit.

* * * * *